US006470290B1

(12) United States Patent
Lee et al.

(10) Patent No.: US 6,470,290 B1
(45) Date of Patent: Oct. 22, 2002

(54) DEVICE HAVING AN IMPROVED APPARATUS AND METHOD FOR SETTING POWER MANAGEMENT MODE

(75) Inventors: Young Ju Lee; Jong Goon Choi, both of Kyungki-Do (KR)

(73) Assignee: LG Electronics, Inc., Seoul (KR)

( * ) Notice: Subject to any disclaimer, the term of this patent is extended or adjusted under 35 U.S.C. 154(b) by 79 days.

(21) Appl. No.: 09/653,581

(22) Filed: Aug. 31, 2000

(30) Foreign Application Priority Data

Aug. 31, 1999 (KR) ............................................. 99-36550
Aug. 31, 1999 (KR) ............................................. 99-36706

(51) Int. Cl.[7] ................................................. G06F 1/32
(52) U.S. Cl. ......................... 702/132; 702/60; 702/63; 713/300; 713/320; 713/340; 324/425
(58) Field of Search ........................... 702/132, 63, 60, 702/130; 713/324, 300, 323, 320, 340; 324/426, 425

(56) References Cited

U.S. PATENT DOCUMENTS 5,511,205 A  * 4/1996  Kannan et al. ............. 713/324
6,029,119 A  * 2/2000  Atkinson .................... 702/132
6,198,245 B1 * 3/2001  Du et al. .................... 318/471

* cited by examiner

*Primary Examiner*—Kamini Shah
*Assistant Examiner*—Hien Vo
(74) *Attorney, Agent, or Firm*—Fleshner & Kim, LLP

(57) ABSTRACT

The present invention supports power management modes which includes (1) a maximum power performance mode, (2) a battery-optimized mode, and (3) a performance/optimization cycling mode for performing the maximum performance mode and the battery-optimized mode alternately within a prescribed period of time. The cycling mode allows flexibility in power management and faster charging of the battery.

17 Claims, 6 Drawing Sheets

FIG. 3

| A/C POWER | TEMPERATURE | RESIDUAL AMOUNT OF BATTERY | POWER MANAGEMENT MODE |
|---|---|---|---|
| A/C POWER CONNECTED | LOW/MIDDLE | OVER 50% | M.P.M |
| | | BELOW 50% | P.O.C.M.1 |
| | HIGH | IRRELEVANT | P.O.C.M.2 |
| A/C POWER NOT CONNECTED | LOW | HIGH | P.O.C.M.2 |
| | | MIDDLE | P.O.C.M.3 |
| | | LOW | B.O.M |
| | MIDDLE | HIGH | P.O.C.M.3 |
| | | MIDDLE | P.O.C.M.4 |
| | | LOW | B.O.M |
| | HIGH | HIGH | P.O.C.M.4 |
| | | MIDDLE | B.O.M |
| | | LOW | B.O.M |

M.P.M: MAXIMUM POWER PERFORMANCE MODE
P.O.C.M.: PERFORMANCE/OPTIMIZATION CYCLING MODE
B.O.M: BATTERY OPTIMIZED MODE

DEVICE HAVING AN IMPROVED APPARATUS AND METHOD FOR SETTING POWER MANAGEMENT MODE

BACKGROUND OF THE INVENTION

1. Field of the Invention

The present invention relates to an electronic device, and more particularly, a device having an apparatus and method for setting a power management mode

2. Background of the Related Art

In an electronic device using a battery, such as a notebook computer, power management is important. For notebook computers using a Pentium CPU manufactured by the Intel Corporation, the CPU uses a Geyserville technology, which supports two power management modes, i.e., a high performance mode and a battery-optimized mode.

The notebook computer uses the high performance mode under the environment of AC power source, and uses the battery-optimized mode under the environment of a battery-only power source. In addition, the menu wherein an user can set the default mode in each environment is realized through Power Management applet (WordPad, Graphic Panel, or the like) in control panel programs of Microsoft Windows.

FIG. 1A illustrates a notebook computer 1 having a recess for receiving a smart battery 50 and input 2 for receiving the voltage from an AC/DC adapter 3, and FIG. 1B illustrates a schematic block diagram of a general notebook. In FIG. 1B, a central processing unit (CPU) 10 controls the overall operation, and a Geyserville ASIC 20 controls the mode-switching of a power mode driven in the system. A core chipset 30 manages the I/O interface between the system and a peripheral device upon receipt of a command from the CPU. A micro controller 40 handles the interaction of a keyboard, mouse interface, power management, and battery interface. A smart battery 50 is used as a power source when an external power source is not available or not used, and a power detector 60 detects the application of the external power source.

The conventional notebook computer system implements the power management mode of the CPU according to which power source is provided. Since power management is implemented by only two modes, i.e., the maximum performance mode and battery-optimized mode, according to whether or not AC power detected from the power detector 60 is applied, the power management is not efficiently achieved from an optimized power use point of view. Here, the maximum performance mode means a state where the load of the system is maximum and other devices are operated according to this. The battery-optimized mode means idle state of parts of a device, that is, power save state. In addition, in the case where the battery residual amount of the notebook computer is less than 50%, if a AC power source is plugged into the computer while using a battery only as a power source during a work on computer, most of the power is supplied to the system and only a part thereof is supplied to the battery, for thereby making the charging speed slower.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the present invention is to improve power management. Another object of the present invention is to allow flexibility in power management.

A further object of the present invention is to allow user to set the power management.

Still another object of the present invention is to quickly charge the battery.

A further object of the present invention is to increase the number of power management modes.

It is an object of the present invention to provide an apparatus and method for setting a power management mode capable of easily and simply setting the power management mode for a notebook computer system, and automatically setting the power management mode for the notebook computer system as an optimized mode according to the current operating state.

It is another object of the present invention to provide a charging method for reducing the charge time of a battery by appropriately converting the operating mode of a central processing unit of a Geyserville within the range of less effecting the performance of a computer, if the charging residual amount of a charging battery is judged to be less than a predetermined value when a power mode is converted to an adapter mode from a battery mode.

To achieve the above objects, there is provided an apparatus for setting a power management mode according to the present invention which includes: at least one detecting unit for monitoring the temperature state of a notebook computer, the charging state of a battery, and the power applying state from external source; a storing unit for storing the state of the individual condition and an appropriate power management mode in connection with each other; and a control unit for reading the power management mode corresponding to the current state of the individual monitored condition from the storing unit and for setting the same as a power management mode for the notebook computer.

In addition, there is provided a method for setting a power management mode according to the present invention which includes the steps of: continuously monitoring the temperature state of a notebook computer, charging state of a battery, and whether an external power is applied or not for setting a power management mode; reporting the result of the monitoring to a control unit and setting the power management mode as manual or automatic by an user; and checking the power management mode according to the current monitoring state from a memory to set the same as the power management mode for the apparatus, if the power management mode is set manual, or selecting and setting the power management mode by key input by the user, if the power management mode is set automatic.

Furthermore, while the notebook computer is operated only by the battery, it is operated in a maximum performance mode if the battery residual amount is more than 50% when an AC power source is inputted. On the other hand, if the battery residual amount is less than 50%, the maximum performance mode is switched to a Geyserville cycling mode so as to make the charging speed higher.

The present invention can be achieved in a whole or in parts by a method of selecting one of a plurality of modes for power management, the method comprising: selecting a maximum performance mode based on a first condition; selecting a battery-optimized mode based on a second condition; and selecting a third mode different from maximum performance mode and the battery-optimized mode based on a third condition.

The present invention can be achieved in a whole or in parts by a apparatus for allowing a system to have a plurality of modes for power management comprising: a controller which supports the plurality of modes, wherein the plurality of modes includes a maximum performance mode, a battery optimized mode and a performance/optimization cycling mode, wherein during the performance/optimization cycling mode, the maximum performance mode is performed for a first prescribed period of time and the battery optimized mode is performed for a second prescribed period of time.

The present invention can be achieved in a whole or in parts by a method for setting a power management mode for a system, comprising: continuously monitoring the temperature state of the system, the charging state of a battery, and the application of power from an external source for setting a power management mode; and checking the power management mode according to the result of the monitoring from a memory for setting the same as the power management mode for the apparatus.

The present invention can be achieved in a whole or in parts by a system having prescribed function and operation to achieve a prescribed result, the system having an apparatus for setting a power management mode, wherein the apparatus includes: at least one detector to monitor a condition of the system based on the temperature, remaining charge of a battery, and whether an external power is applied or not; and a controller for determining the power management mode corresponding to monitored condition from the storing unit.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 illustrates the correlation of detected conditions with the power management mode in accordance with a preferred embodiment of the present invention;

DETAILED DESCRIPTION OF PREFERRED EMBODIMENTS

Figure 1A:
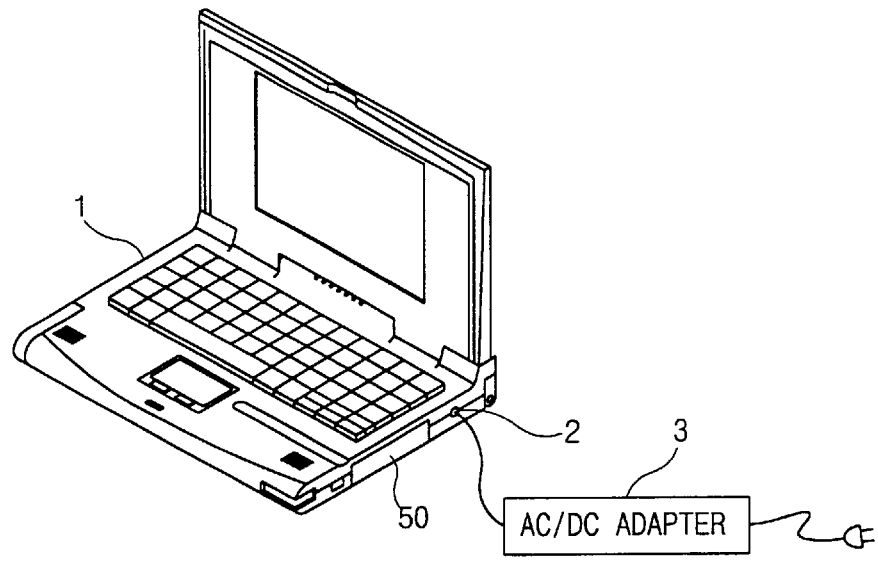
FIG. 1A illustrates a notebook computer.
Figure 1B:
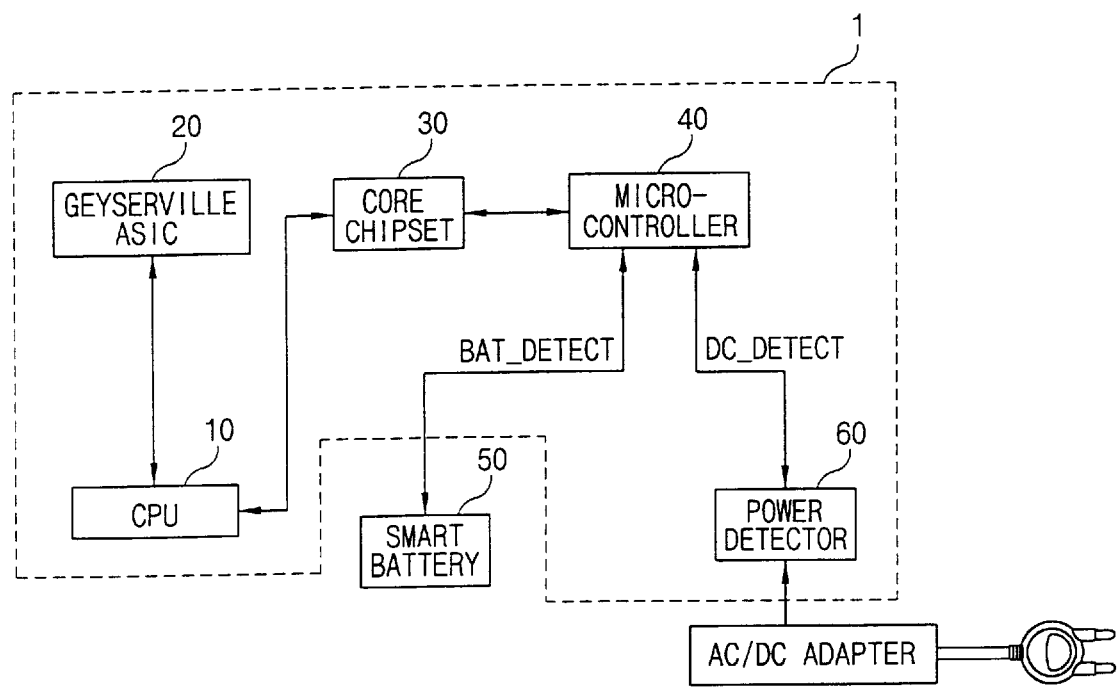
FIG. 1B illustrates a schematic block diagram of a general notebook.
Figure 2:
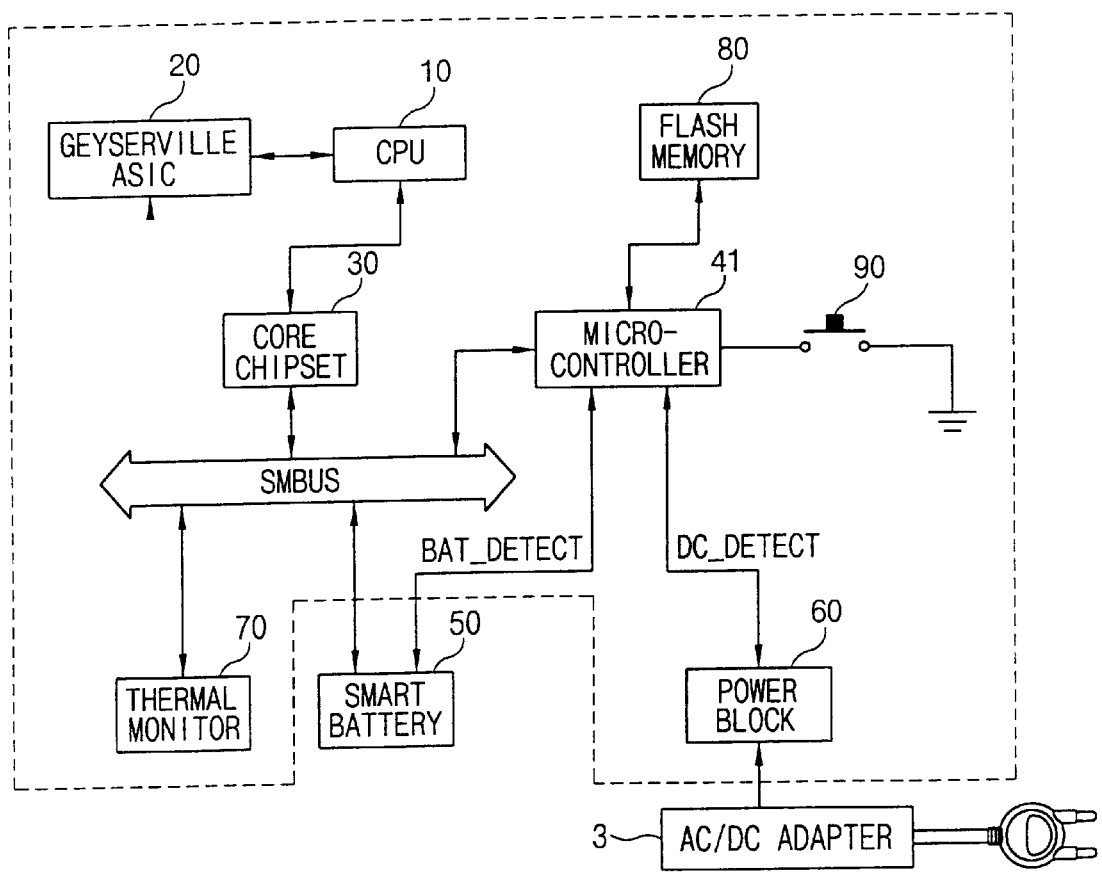
FIG. 2 illustrates the construction of a notebook system according to an apparatus for setting a power management mode according to a preferred embodiment of the present invention.

FIG. 2 illustrates the construction of a notebook system according to an apparatus for setting a power management mode of the present invention. FIG. 2 is somewhat similar to FIG. 1, but further includes: a thermal monitor 70 for detecting the temperature of a predetermined position on a PCB of a computer main board; a flash memory 80 for storing the state of an individual preset condition for setting a power management mode and an appropriate optimized power management mode in connection with each other; and a power mode setting button 90 for manually setting a power management mode by an user. According to the state of the individual preset condition for setting a power management mode and whether or not the user depresses the power mode setting button 90, the function and operation of a controller 41 for automatically or manually setting the power management mode for the notebook system are different from FIG. 1.

The controller 41 supports power management modes for a notebook computer system, including (1) a maximum power performance mode wherein the load of the system is maximum and other devices are operated according to this, (2) a battery-optimized mode wherein parts of the devices are in power save state in case of an idle state, and (3) a performance/optimization cycling mode for performing the maximum performance mode and the battery-optimized mode alternately within a prescribed period of time.

The performance/optimization cycling mode (POCM) includes at least one additional power management mode, which alternately utilizes the maximum performance mode (PM) and the battery optimized mode (BOM) for a prescribed period of time $D_T$ based on MPM and BOM duration ratio $R_{P/O}$, where $R_{P/O}=T_P/T_O$, $T_P$ being the cumulative duration of the maximum performance mode for a first prescribed period of time $D_1$ and $T_O$ being the cumulative duration of the battery optimized mode for a second prescribed period of time $D_2$. Since the PCOM is performed for a period of time $D_T$, $D_T=D_1+D_2$.

For example, in the preferred embodiment, there are four additional power management modes based on the duration ratio $R_{P/O}$ of POCM1, POCM2, POCM3 and POCM4 for a prescribed period of time $D_T$ of 100 ms. In POCM1, the $R_{P/O}=4:1$, where $T_P=80$ ms and $T_O=20$ ms, such that the MPM is performed for 80 ms and thereafter BOM is performed for 20 ms within the 100 ms prescribed period of time $D_T$. In POCM2, the $R_{P/O}=3:2$, where $T_P=60$ ms and $T_O=40$ ms, such that the MPM is performed for 60 ms and thereafter BOM is performed for 40 ms within the 100 ms prescribed period of time $D_T$. In POCM3, the $R_{P/O}=2:3$, where $T_P=40$ ms and $T_O=60$ ms, such that the MPM is performed for 40 ms and thereafter BOM is performed for 60 ms within the 100 ms prescribed period of time $D_T$. In POCM4, the $R_{P/O}=1:4$, where $T_P=20$ ms and $T_O=80$ ms, such that the MPM is performed for 20 ms and thereafter BOM is performed for 80 ms within the 100 ms prescribed period of time $D_T$.

In the preferred embodiment of POCM, the MPM and the BOM are alternately performed once. However, as can be appreciated, the cycling between the MPM and the BOM can be performed repetitively for the prescribed period of time DT based on the duration ratio $R_{P/O}$. For example, the MPM can be performed for first 40 ms, the BOM can be performed for the next 10 ms, the MPM can be performed for the next 40 ms and the BOM can be performed for the last 10 ms in the POCM1 such that the duration ratio $R_{P/O}$ of 4:1 is maintained for the prescribed period of time $D_T$.

As can be further appreciated, the prescribed period of time can be variably set by the manufacturer or the user, with or without manufacturers recommendation, depending on the contemplated use of the notebook computer or whether the user desires more speedier charge of the smart battery during the mode cycling. Further, the duration ratio $R_{P/P}$ can be variably set by the manufacturer or the user, with or without the manufacturer's recommendation, depending on the contemplated use of the notebook computer or whether the user desires more speedier charge of the smart battery.

As described above, the user can use the power mode setting button to select one of MPM, BOM, POCM1, POCM2, POCM3 and POCM4, which will be described hereinafter, or the controller 41 can automatically control the power management mode based on information provided by the thermal monitor 70 and smart battery 50 via the system bus SMBUS and the detection of the external power source via the power block 60, which is compared with the information stored in the flash memory 80.

The thermal monitor 70 continuously detects the internal temperature of the notebook system and transmits the value thereof to the controller 41. The temperature T detected by the thermal monitor, sensor or temperature detection unit 70 is pre-classified into a low temperature value $T_L$ if the detected temperature falls within a first temperature range $T_1$, a medium temperature value $T_M$ if the detected temperature falls within a second temperature range $T_2$, and a high temperature value $T_H$ if the detected temperature falls within a third temperature range $T_3$, where $T_1<T_2<T_3$.

Similarly, the smart battery provides information regarding the residual amount RA of charge and the residual amount detected by the controller 41 is classified in to low, medium and high. A low residual amount $RA_L$ is determined if the RA is less than 20%, a medium residual amount $RA_M$ is determined if the RA is between 20% to 50%; and a high residual amount $RA_H$ is determined if the RA is greater than 50%.

The information regarding the detection of the external power source, temperature classification and residual amount classification is stored in the flash memory 80. Further, the flash memory stores the power management mode operation for the controller based on such information. Further, the flash memory preferably stores $D_T$ and $R_{P/O}$ for PCOM.

FIG. 3 illustrates the correlation of such information with the power management mode stored in the flash memory 80. When the external power source is connected and the temperature values is $T_L$ or $T_M$, the controller 41 supports MPM when the RA is over 50% and the controller 41 supports POCM1 when the RA is less than 50%. However, when the temperature value is $T_H$, the RA is irrelevant and the controller 41 supports POCM2.

In the instance of external power source disconnect, the power management mode vary between BOM and POCM in the preferred embodiment. When the temperature value is $T_L$, the controller 41 supports POCM2 when the RA is $RA_H$, POCM3 when the RA is $RA_M$, and BOM when the RA is $RA_L$. When the temperature value is $T_M$, the controller 41 supports POCM3 when RA is $RA_H$, POCM4 when RA is $RA_M$, and BOM when RA is $RA_L$. When the temperature value is $T_H$, the controller 41 supports POCM4 when RA is $RA_H$, BOM when RA is $RA_M$ or $RA_L$.

As can be appreciated, the dominant and subordinate information used for power management mode can be varied. In the preferred embodiment, the temperature was used as the dominant information and the residual amount as the subordinate information. Such criteria can be switched, and further, both criteria need not be used. Moreover, the power management mode using MPM, BOM and POCM based on temperature, residual amount and external power detection is not limited to the particular format illustrated in FIG. 4. Further, other addition or replacement information can be used to correlate the power management.

Figure 4A:
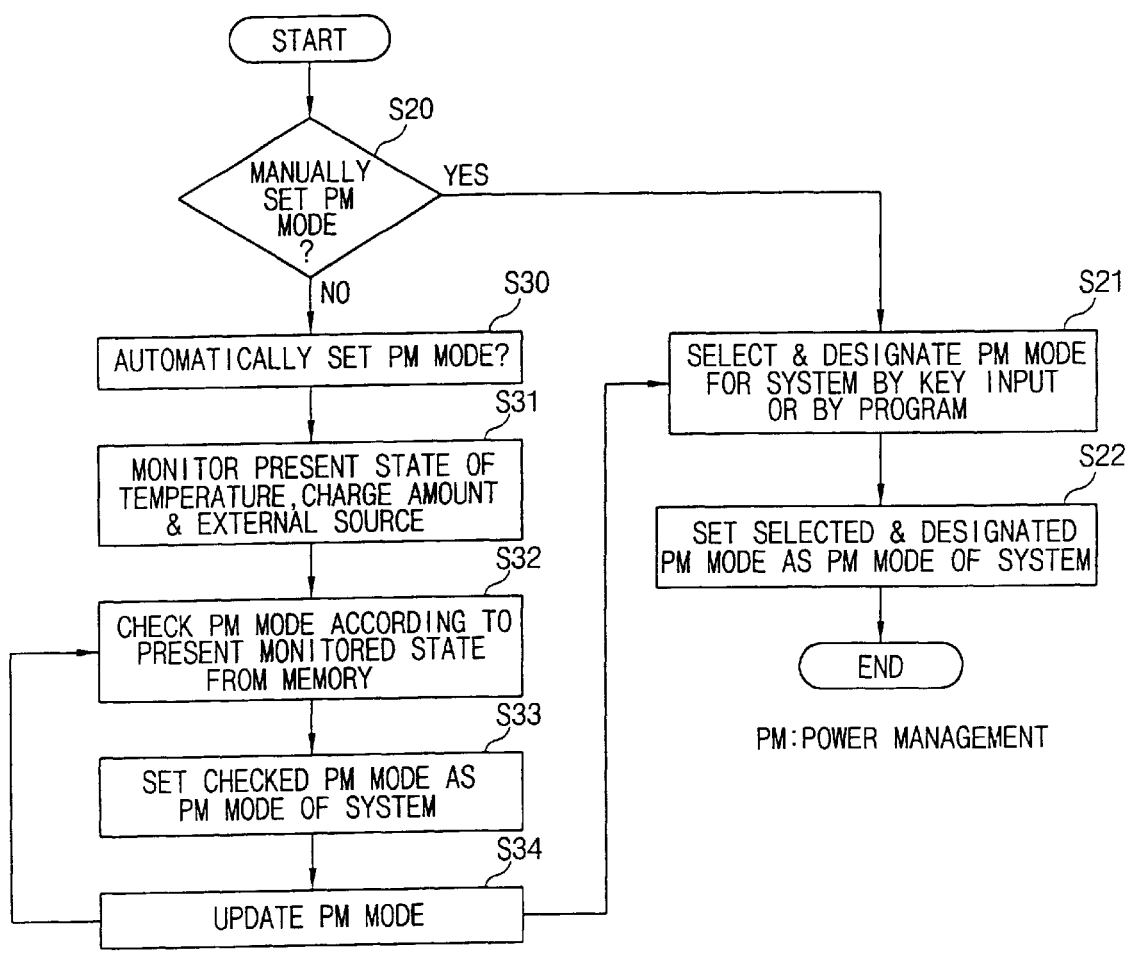
FIG. 4A illustrates a method for manually or automatically setting the power management mode according to a preferred embodiment of the present invention.

FIG. 4A illustrates a method for manually or automatically setting the power management mode according to a preferred embodiment of the present invention.

As shown, the controller determines whether the user has selected manual power management mode by the user pressing the power mode setting button 90 (S20). Whenever the power mode setting button 90 is pressed, the controller 41 changes the power management mode between MPM, POCM1, POCM2, POCM3, POCM4 and BOM in sequence or any other appropriate sequences for the power management mode. After selection by the user (S21) the power management mode is set (S22).

In addition, the user can manually sets the power management mode of the notebook system by software. For example, the user can select the control panel program or management program of the operating system of the notebook PC, Macintosh, or other type of computers to select and designate a desired power management mode of the notebook system among the maximum power mode, performance/optimization cycling mode, and battery-optimized mode, on the Power Management Applet Menu or BIOS Set-up Menu. The controller 41 sets the selected and designated power management mode as the power management mode of the notebook system, thereby manually setting the power management mode of the notebook system.

However, if the manual power management mode is not set, automatic setting of power management mode is selected and designated on the Power Management Applet Menu or BIOS Set-up Menu (S30). The controller 41 monitors the state of each condition for setting the power management mode inputted from the thermal monitor 70, smart battery 50, and power detector 60 (S31).

The power management mode appropriate for the monitored state is checked from the flash memory 80 (S32). For example, if the temperature of a certain particular portion of the computer inputted from the thermal monitor 70 is judged to be a medium level $T_M$, the residual amount of a charging power inputted from the smart battery 50 is judged to be over 50%, and an AC power is judged to be connected, the controller 41 determines that the power management mode appropriate for the state of the above conditions is POCM1 based on the information stored in the flash memory 80. Thereafter, the controller 41 sets the power management mode (S33) and automatically updates the power management mode (S34) until the manual management mode is set.

Figure 4B:
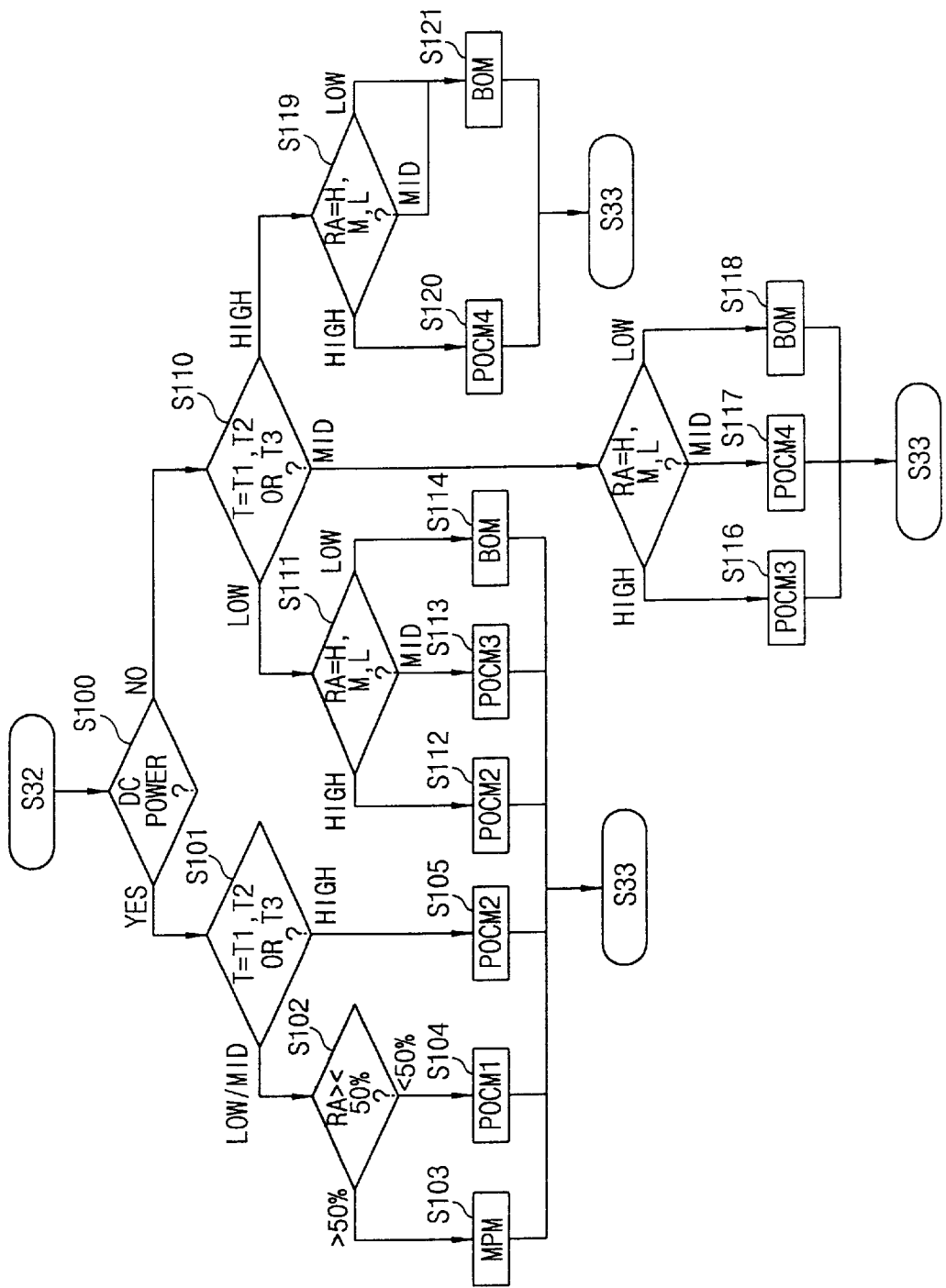
FIG. 4B illustrates the details of the step for automatically checking the power management mode of FIG. 4A.

FIG. 4B illustrates the details of step S32. First, the controller 41 checks the application of external power source based on the DC_DETECT signal from the power detector 60 (S100). If the power source is detected, the controller 41 checks the temperature T provided by the thermal monitor via system bus SMBUS and check whether such information corresponds to $T_L$, $T_M$ or $T_H$ (S101). If $T=T_L$ or $T_M$, the controller checks if RA>50% or RA<50% (S102). If RA>50%, the power management mode is determined to be MPM (S103). However, if RA<50%, the power managment mode is determined to be POCM1 (S104). On the other hand, if $T=T_H$, the power management mode is determined to be POCM2 (S105).

If the external power source is not detected, the controller 41 checks the temperature T provided by the thermal monitor via system bus SMBUS and check whether such information corresponds to $T_L$, $T_M$ or $T_H$ (S110).

If $T=T_L$, the controller checks the RA (S111). If RA=$RA_H$, the power management mode is determined to be POCM2 (S112); if RA=$RA_M$, the power management mode is determined to be POCM3 (S113); and if RA=$RA_L$, the power management mode is determined to be BOM (S114).

If $T=T_M$, the controller checks the RA (S115). If RA=$RA_H$, the power management mode is determined to be POCM3 (S116); if RA=$RA_M$, the power management mode is determined to be POCM4 (S117); and if RA=$RA_L$, the power management mode is determined to be BOM (S118).

If $T=T_H$, the controller checks the RA (S119). If RA=$RA_H$, the power management mode is determined to be POCM4 (S120); if RA=$RA_M$, the power management mode is determined to be BOM; and if RA=$RA_L$, the power management mode is determined to be BOM (S121).

Figure 5A:
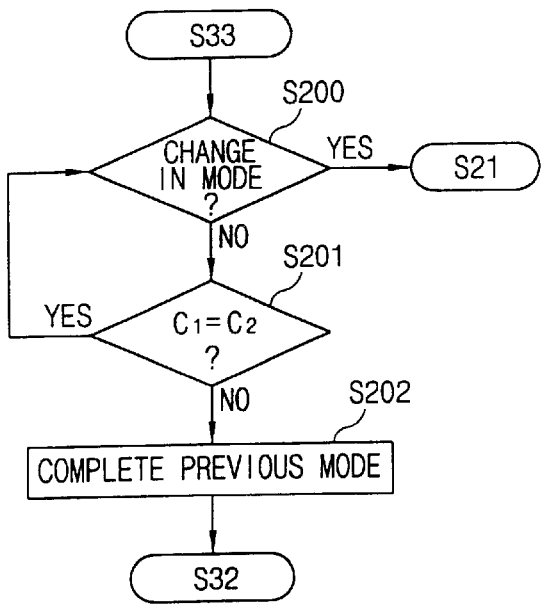
FIG. 5A illustrates the details of automatically updating the power management mode of FIG. 4A accordance with a first preferred embodiment of the present invention.
Figure 5B:
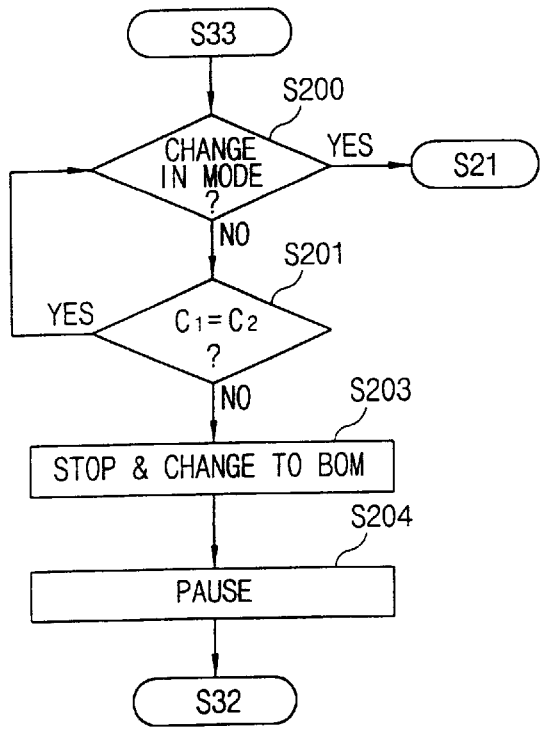
FIG. 5B illustrates the details of automatically updating the power management mode of FIG. 4A in accordance with a second preferred embodiment of the present invention.

FIGS. 5A illustrates the details of automatically updating the power management mode of step S33 in accordance with a first preferred embodiment of the present invention. FIG. 5B illustrates the details of automatically updating the power management mode of step S33 in accordance with a second preferred embodiment of the present invention.

As shown in FIGS. 5A and 5B, the controller 41 determines whether there has been a change in power management mode to manual management by the user (S200). If so, the process returns to step S21. If not, the controller rechecks the present condition $C_2$ for power management mode inputted from the thermal monitor 70, smart battery 50 and power detector 60, and compares the present condition $C_2$ with the previous condition $C_1$ (S201). If the condition has not changed, the process returns to step S200. However, if $C_2$ does not equal $C_1$, two alternative process is used to change the power mode setting.

In FIG. 5A, the controller 41 allows the system to complete the power management mode of the previous condition (S202). After the completion, the controller 41 returns to step S32 to change the power management. For example, if the previous condition $C_1$ corresponded to the power management mode of POGM1 and the change in condition $C_2$ corresponding to POGM2 was detected during the mid-interval, i.e., 50 ms, of the prescribed period of time $D_T$, i.e., 100 ms, the controller 41 changes the power management mode to POGM2 after the 100 ms.

In FIG. 5B, the controller immediately stops the power management mode of the previous condition $C_1$ and changes the power management mode to BOM and is paused in this mode for a preset period of time. Thereafter, the controller 41 changes to the power management mode corresponding to the new condition $C_2$ by returning to step S32. For example, if the previous condition $C_1$ corresponded to the power management mode of POGM1 and the change in condition $C_2$ corresponding to POGM2 was detected during the mid-interval, i.e., 50 ms, the power management mode of POGM1 is halted and changed to BOM and paused for a prescribed period of time. Thereafter, the controller 41 changes the power management mode to POGM2.

The present invention has various advantages. For example, power management is improved and there is more flexibility in the power management. Further, the user can manually set the power management or the power management can be automatically set and updated. Moreover, there is an increase in the number of power management modes, which increase the flexibility in power management, and the battery can be more quickly charged.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. For example, the present invention is not limited to notebook computer, but is readily applicable to all devices using a battery as an alternate power source, including cameras, camcorders, audio players, radios, cell phones, etc.

What is claimed is:

1. A system having prescribed function and operation to achieve a prescribed result, the system having an apparatus for setting a power management mode, wherein the apparatus includes:

at least one detector to monitor a condition of the system based on a temperature, remaining charge of a battery, and whether an external power is applied or not; and a controller for determining the power management mode corresponding to the monitored condition from a storing unit, wherein the power management mode comprises, a maximum performance mode, a battery-optimized mode, and cycling mode for performing automatic alternation between the maximum performance mode and the battery-optimized mode based on a prescribed ratio.

2. The system of claim 1, wherein the cycling mode is performed for a prescribed period of time.

3. The system of claim 1, further comprising a storage device for storing a correlation between the power management mode and the monitored condition.

4. The system of claim 1, wherein at least one senor includes a thermal sensor for detecting the temperature.

5. The system of claim 1, further comprises a key input for selecting one of automatic power management mode and manual power management mode.

6. The system of claim 1, further comprises a readable medium containing means for selecting one of automatic power management mode and manual management mode.

7. A method for setting a power management mode for a system, comprising:

continuously monitoring a temperature state of the system, a charging state of a battery, and an application of power from an external source for setting a power management mode; and checking the power management mode according to the result of the monitoring from a memory for setting the same as the power management mode for an apparatus, wherein the power management mode comprises, a maximum performance mode, a battery-optimized mode, and cycling mode for performing automatic alternation between the maximum performance mode and the battery-optimized mode based on a prescribed ratio.

8. The method of claim 7, further comprising storing a correlation between the power management mode and the monitored condition.

9. The method of claim 7, further comprising selecting one of automatic power management mode and manual management mode.

10. An apparatus for allowing a system to have a plurality of modes for power management comprising:

a controller which supports the plurality of modes, wherein the plurality of modes includes a maximum performance mode, a battery optimized mode and a performance/optimization cycling mode, wherein during the performance/optimization cycling mode, automatically repeating the maximum performance mode for a first prescribed period of time and the battery optimized mode for a second prescribed period of time or vice versa based on a prescribed ratio of the first prescribed period of time and the second prescribed period of time.

11. The apparatus of claim 10, wherein the controller selects one of the plurality of modes based on temperature of the system.

12. The apparatus of claim 11, wherein the controller further selects the mode based on remaining charge.

13. The apparatus of claim 12, wherein the controller further selects the modes based on a connection to an external power source.

14. A method of selecting one of a plurality of modes for power management, the method comprising:

selecting a maximum performance mode based on a first condition;

selecting a battery-optimized mode based on a second condition; and selecting a third mode different from maximum performance mode and the battery-optimized mode based on a third condition, wherein the third mode is a hybrid of the maximum performance mode and the battery-optimized mode.

15. The method of claim 14, wherein the third mode comprises automatically alternating between the maximum performance mode and the battery-optimized mode within a prescribed period of time.

16. The method of claim 15, wherein in the third mode, the alternation within a prescribed period of time is manually set based on a prescribed ratio between the maximum performance mode and the battery-optimized mode during the prescribed period of time.

17. The method of claim 14, further comprising storing a correlation between the plurality of modes for power management, the first condition, the second condition and the third condition.

* * * * *